US008842535B2

(12) United States Patent
Shiva et al.

(10) Patent No.: US 8,842,535 B2
(45) Date of Patent: Sep. 23, 2014

(54) METHOD AND APPARATUS FOR RADIO LINK CONTROL DURING NETWORK CONGESTION IN A MOBILE WIRELESS DEVICE

(75) Inventors: Sundararaman V. Shiva, Los Gatos, CA (US); Longda Xing, San Jose, CA (US); Jianxiong Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 681 days.

(21) Appl. No.: 12/849,725

(22) Filed: Aug. 3, 2010

(65) Prior Publication Data

US 2012/0033554 A1 Feb. 9, 2012

(51) Int. Cl.
*H04W 72/12* (2009.01)
*H04W 28/02* (2009.01)
*H04W 72/02* (2009.01)
*H04W 72/14* (2009.01)

(52) U.S. Cl.
CPC .............. *H04W 72/02* (2013.01); *H04W 72/14* (2013.01); *H04W 28/0205* (2013.01)
USPC ........................................................ 370/235

(58) Field of Classification Search
CPC .. H04W 72/02; H04W 72/14; H04W 28/0205
USPC ................. 370/229, 235, 310, 328, 329, 330; 455/403, 422.1, 446, 447, 450
See application file for complete search history.

(56) References Cited

U.S. PATENT DOCUMENTS

| 6,016,311 | A  | * | 1/2000  | Gilbert et al. ................. 370/280  |
| 6,366,761 | B1 | * | 4/2002  | Montpetit ..................... 455/12.1  |
| 6,459,687 | B1 | * | 10/2002 | Bourlas et al. ................ 370/328   |
| 6,738,350 | B1 | * | 5/2004  | Gao et al. ...................... 370/232   |
| 6,937,580 | B2 | * | 8/2005  | Heatwole et al. ............. 370/322    |
| 7,664,017 | B2 |   | 2/2010  | Sagfors                                 |
| 7,702,289 | B2 | * | 4/2010  | Tzavidas et al. ............... 455/69   |
| 7,715,845 | B2 | * | 5/2010  | Jin et al. ........................ 455/447  |
| 7,724,656 | B2 | * | 5/2010  | Sågfors et al. ................ 370/229  |

(Continued)

FOREIGN PATENT DOCUMENTS

| TW | 201004212      | 1/2010 |
| WO | WO2008029245   | 3/2008 |
| WO | WO2009096746   | 8/2009 |
| WO | WO 2010/051513 | 5/2010 |

OTHER PUBLICATIONS

International Search Report dated Oct. 26, 2011 in PCT Application No. PCT/US2011/044571.

(Continued)

*Primary Examiner* — Chi Pham
*Assistant Examiner* — Robert Lopata
(74) *Attorney, Agent, or Firm* — Womble Carlyle Sandridge & Rice LLP

(57) ABSTRACT

A method and apparatus for radio link control during network congestion in a mobile wireless communication device connected to a radio network subsystem in a wireless cellular network. The mobile wireless communication device detects a pending uplink control message. The mobile wireless communication device determines that an uplink channel on which the pending uplink control message is to be sent has insufficient bandwidth for uplink transmission. After waiting a congestion delay time interval, the mobile wireless communication device sends the pending uplink control message on an uplink signaling channel instead of on the uplink channel. In some embodiments, the uplink channel is associated with a radio access bearer and the uplink signaling channel is associated with a signaling radio bearer.

13 Claims, 10 Drawing Sheets

(56) References Cited

U.S. PATENT DOCUMENTS

| | | | |
|---|---|---|---|
| 7,774,686 B2* | 8/2010 | Ahn et al. | 714/776 |
| 7,965,683 B2* | 6/2011 | Mu et al. | 370/330 |
| 7,974,177 B2* | 7/2011 | Ofuji et al. | 370/203 |
| 2003/0179720 A1 | 9/2003 | Cuny | |
| 2004/0127226 A1* | 7/2004 | Dugad et al. | 455/450 |
| 2004/0179852 A1* | 9/2004 | Westbrook et al. | 398/183 |
| 2005/0007991 A1* | 1/2005 | Ton et al. | 370/349 |
| 2005/0063330 A1* | 3/2005 | Lee et al. | 370/328 |
| 2006/0187840 A1 | 8/2006 | Cuffaro et al. | |
| 2007/0211656 A1* | 9/2007 | Kwak et al. | 370/319 |
| 2008/0253325 A1* | 10/2008 | Park et al. | 370/329 |
| 2009/0181687 A1* | 7/2009 | Tiirola et al. | 455/450 |
| 2009/0190560 A1* | 7/2009 | Kim et al. | 370/335 |
| 2009/0191848 A1 | 7/2009 | Helferich | |
| 2009/0241004 A1 | 9/2009 | Ahn et al. | |
| 2010/0002655 A1* | 1/2010 | Ofuji et al. | 370/335 |
| 2010/0046460 A1* | 2/2010 | Kwak et al. | 370/329 |

OTHER PUBLICATIONS

Written Opinion dated Oct. 26, 2011 in PCT Application No. PCT/US2011/044571.

"3$^{rd}$ Generation Partnership Project; Technical Specification Group Radio Access Network; Enhanced uplink; Overall description; Stage 2 (Release 10)" 3GPP Standard; 3GPP TS 25.319, 3$^{RD}$ Generation Partnership Project (3GPP), Mobile Competence Centre; No. V10.1.0, Jun. 15, 2010.

"3$^{rd}$ Generation Partnership Project; Technical Specification Group Radio Access Network; Medium Access Control (MAC) protocol specification (Release 9)" 3GPP Standard; 3GPP TS 25.321, 3$^{RD}$ Generation Partnership Project (3GPP), Mobile Competence Centre; No. V9.3.0, Jun. 17, 2010.

Taiwan Patent Application No. 100126574—Office Action dated Dec. 23, 2013.

Korean Patent Application No. 10-2013-7005399—Office Action dated Feb. 25, 2014.

Japanese Patent Application No. 2013-523183—First Office Action dated Feb. 10, 2014.

European Patent Application No. 11746692.0—Office Action dated Feb. 12, 2014.

* cited by examiner

METHOD AND APPARATUS FOR RADIO LINK CONTROL DURING NETWORK CONGESTION IN A MOBILE WIRELESS DEVICE

TECHNICAL FIELD

The described embodiments relate generally to wireless mobile communications. More particularly, a method and apparatus is described for radio link control during periods of radio access network congestion in a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem (RNS) located in the cell. The radio network subsystem can include a base transceiver station (BTS) in a Global System for Communications (GSM) network or a Node B in a Universal Mobile Telecommunications System (UMTS) network. Whether idle or actively connected, a mobile wireless communication device can be associated with a "serving" cell in a wireless communication network and be aware of neighbor cells to which the mobile wireless communication device can also associate.

Mobile wireless communication devices can support both voice and data connections, in some cases simultaneously, through radio resources allocated by the radio network subsystem for a radio access portion of the wireless communication network. The voice and data connections can also include paths through circuit switched (CS) and/or packet switched (PS) domains of a core network (CN) that can interconnect the mobile wireless communication device to a public switched telephone network (PSTN) and/or a public data network (PDN). In order for a PS data connection to transmit packets, also known as protocol data units (PDUs), reliably over the radio access portion between the mobile wireless communication device and the wireless communication network, a layer 2 radio link control (RLC) protocol can be used. The RLC protocol can include an "acknowledged" mode that ensures correct delivery of transmitted packets. Unacknowledged packets can be retransmitted by a transmitting end when the packets are received incorrectly by a receiving end. The transmitting end can rely on an acknowledgement (ACK) message or a negative acknowledgement (NACK) message from the receiving end to indicate whether the transmitted packet is correctly received. These ACK/NACK messages can be included with other control information in control messages, such as status PDUs, sent to the wireless communication network from the mobile wireless communication device. In the absence of receiving status PDUs as expected, after a suitable time period, the transmitting end can choose to reset the communication link between the mobile wireless communication device and the radio network subsystem of the wireless communication network by sending a reset control message, such as a RESET PDU, which can be acknowledged by the receiving end by a control message such as a RESET_ACK PDU. The status PDU, RESET PDU and RESET_ACK PDU can form part of a set of RLC control PDUs critical to maintaining a PS data connection. If the RLC control PDUs cannot be transmitted during periods of network congestion, then a PS data connection can be released by the wireless communication network, resulting in an undesirable call drop for the user of the mobile wireless communication device.

During periods with high communication traffic in the radio access portion of the wireless communication network, the radio network subsystem can choose to manage network congestion by allocating a reduced amount of radio resources to the mobile wireless communication device for the PS data connection. PS data connections can be considered non real-time and therefore less critical than real-time CS connections, such as voice calls. When the amount of radio resources allocated is less than required by the mobile wireless communication device to transmit the RLC control PDUs required in the uplink direction for a PS data connection, the PS data connection can be terminated. In addition to the PS data connection, a simultaneous CS data connection between the mobile wireless communication device and the wireless communication network can also be terminated. Network congestion for the packet data connection can inadvertently affect the stability of a circuit switched voice connection.

Thus there exists a need to modify radio link control between the mobile wireless communication device and the radio network subsystem of the wireless communication network during periods of radio access network congestion.

SUMMARY OF THE DESCRIBED EMBODIMENTS

The described embodiments relate generally to wireless mobile communications. More particularly, a method and apparatus is described for radio link control during periods of radio access network congestion in a mobile wireless communication device.

In one embodiment, a method for radio link control in a mobile wireless communication device can include at least the following steps. The mobile wireless communication device is connected to a radio network subsystem in a wireless cellular network. The mobile wireless communication device detects a pending uplink control message. The mobile wireless communication device determines that an uplink channel on which the pending uplink control message is to be sent has insufficient bandwidth for uplink transmission. After waiting a congestion delay time interval, the mobile wireless communication device sends the pending uplink control message on an uplink signaling channel instead of on the uplink channel. In some embodiments, the uplink channel is associated with a radio access bearer and the uplink signaling channel is associated with a signaling radio bearer.

In another embodiment, an apparatus for radio link control in a mobile wireless communication device can include at least the following elements. The apparatus includes a transceiver configured for receiving downlink data packets on a data radio access bearer from a radio network subsystem in a wireless cellular network. The transceiver is also configured for sending uplink control packets on the data radio access bearer to the radio network subsystem. The uplink control packets acknowledge receipt of the downlink data packets. The transceiver is configured to detect an uplink congestion condition on the data radio access bearer between the mobile wireless mobile communication device and the radio network subsystem in the wireless cellular network. The transceiver is configured to send the uplink control packets on a signaling radio bearer instead of on the data radio access bearer while the uplink congestion condition persists. In some embodiments the transceiver is further configured for receiving a serving grant that limits the amount of data to send on the radio access bearer in the uplink direction. In a representative embodiment, the uplink congestion condition occurs when the serving grant does not permit at least one uplink control packet in the uplink direction during a transit time interval.

In yet another embodiment, a computer program product encoded in a computer readable medium for radio link control in a mobile wireless communication device can include at least the following elements. The computer program product includes non-transitory computer program code for detecting a pending uplink message. The non-transitory computer program code calculates a transmission capacity on a first uplink channel between the mobile wireless communication device and the wireless network. The non-transitory computer program code compares the calculated transmission capacity to a message size required to send the pending uplink message in a time interval. When the calculated transmission capacity is less than required to send the pending uplink message in the time interval, the non-transitory computer program code sends the pending uplink message on a second uplink channel between the mobile wireless device and the wireless network. In some embodiments, the first and second uplink channels are associated with different radio bearers. If further embodiments, the first uplink channel is associated with a data radio access bearer, and the second uplink channel is associated with a signaling radio bearer.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
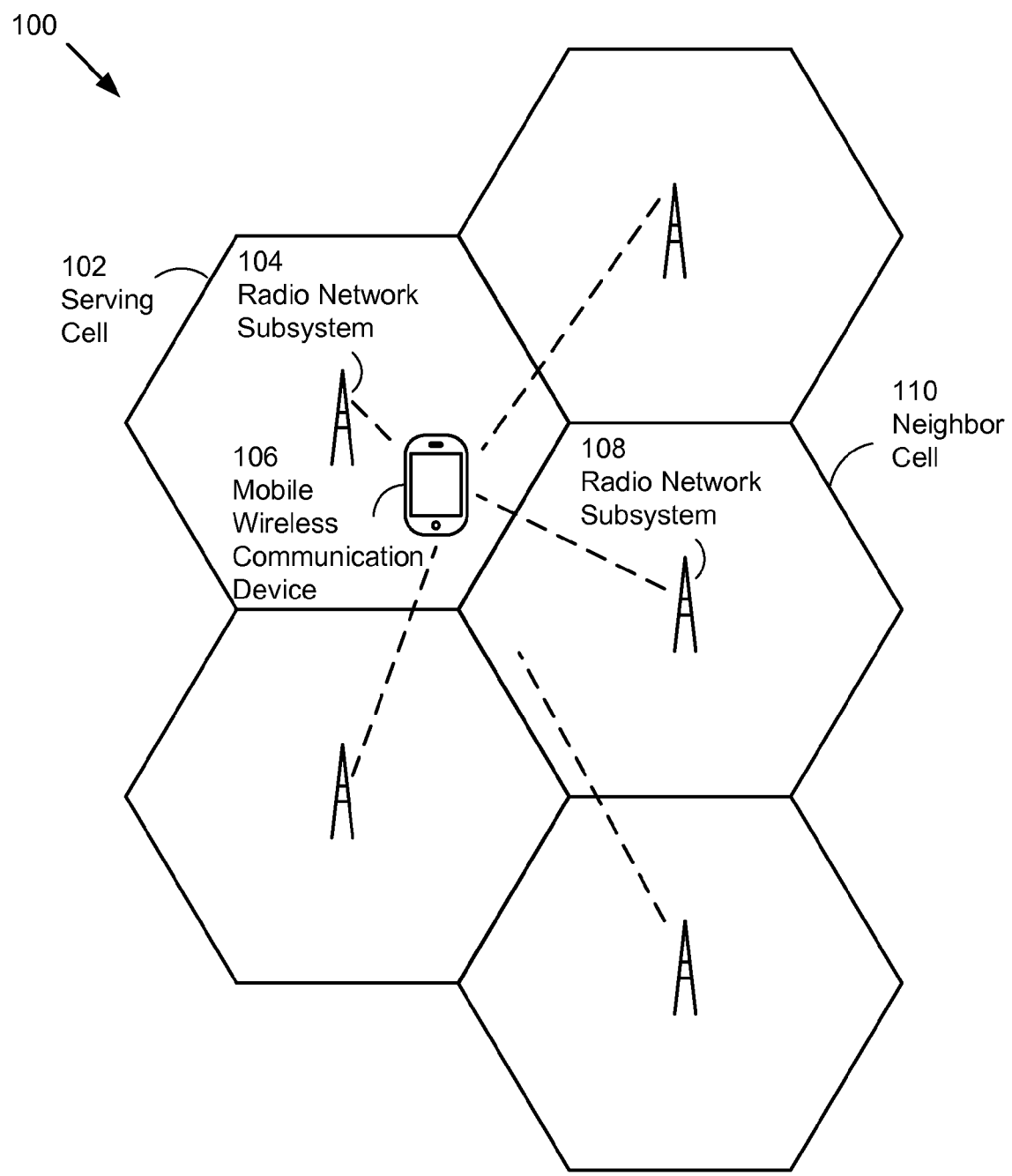
FIG. 1 illustrates a mobile wireless communication device located within a wireless cellular communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices can provide a multiplicity of services including both voice and data connections through wireless communication networks. A data connection (and a voice connection) between a mobile wireless communication device and a wireless communication network can use a hierarchical layered communication protocol stack, each layer in the communication protocol stack providing a set of functions between peer entities at a transmitting end and a receiving end of the data connection. A first lowest physical layer can provide bit level transport specific to a communication medium, while a second higher data link layer can provide a reliable packet layer transport. A radio link control (RLC) layer (or sub-layer) within the data link layer can divide higher layer messages into numbered sequences of packets, also known as protocol data units (PDUs), and ensure reliable delivery through confirmation of packet reception using an acknowledged mode. Communication through the RLC layer can rely on feedback from the receiving end to the transmitting end that can indicate correct or incorrect reception of a PDU. Without feedback, the transmitting end can assume the PDU can be lost or corrupted and can re-transmit the PDU. When no feedback from the receiving end persists after sending packets, the transmitting end can attempt to reset the RLC layer between the RLC peer entities. If there is no response from the receiving end to repeated attempts by the transmitting end to reset the RLC layer, the data connection (and all other parallel voice and data connections between the mobile wireless communication device and the wireless communication network) can be dropped. Thus a stall of data flow in one direction of a data connection can affect other simultaneous data or voice connections between the mobile wireless communication device and the wireless communication network.

Feedback from the receiving end at the RLC layer can be impacted by congestion in the radio access portion of the wireless communication network, as the feedback messages can use the same radio resources as data messages from the mobile wireless communication device to the wireless communication network. The amount of data that the mobile wireless communication device can send in an uplink direction to the wireless communication network can be set by commands from radio network controllers (RNCs) and/or Node B's of the radio network subsystems in the wireless communication network. The data carrying throughput capability in the uplink direction can change dynamically for different transmit time intervals based on radio network subsystem commands and can be lowered to a level where no uplink RLC PDUs can be transmitted. A minimum size uplink RLC PDU can exceed the number of bits available in a transmit time interval, and both uplink data PDUs and uplink control PDUs, that can contain acknowledgements for downlink PDUs, can be stalled in a buffer at the mobile wireless communication device.

Separate signaling connections between the mobile wireless communication device and the wireless communication network can simultaneously exist that can use separate radio resources and can be available for transmission even when the radio resources used for data PDUs and control PDUs can be blocked by radio access network congestion. The separate signaling connection can have a limited but guaranteed throughput capacity for transmission. While a limited throughput capacity on the signaling connection can be inadequate for transmitting control PDUs continuously, infrequent use of the signaling connection to convey critical information in control PDUs when radio access network congestion can block the data connection can provide a method to maintain the data connection. The mobile wireless communication device can detect the presence of radio access network congestion on an uplink data connection and can use the separate signaling connection to transport at least a portion of the information from uplink control PDUs to maintain the data connection until the radio access network congestion abates.

As illustrated in FIG. 1, a mobile wireless communication device 106 can include the capability to connection seamlessly with a wireless communication network 100 of overlapping wireless cells, each wireless cell covering a geographic area extending from a radio network subsystem (RNS) located within the wireless cell. The mobile wireless communication device can be associated with an RNS 104 in a serving cell 102 and can receive and monitor signals from an RNS 108 in a neighbor cell 110. After associating with the serving cell 102, the mobile wireless communication device 106 can initiate connections (such as voice or data calls) with the wireless communication network 100 through the radio network subsystem 104 of the serving cell 102. The radio network subsystem 104 in the serving cell 102 can also initiate connections to the mobile wireless communication device 106, as the wireless network 100 can be aware of the association between the serving cell 102 and the mobile wireless communication device 106. As multiple mobile wireless communication devices in the serving cell 102 can share a set of radio frequency resources for connections to the wireless communication network 100, the RNS 104 in the serving cell 102 can manage actively the amount of radio resources available to the mobile wireless communication device 106 through an allocation scheme. Connections that provide time critical services, such as a voice connection, can be prioritized over connections that support non real-time services, such as an internet data connection. Both the downlink and uplink directions of a connection can be managed separately by the RNS 104, and connections can support asymmetric rates in each direction.

Figure 2:
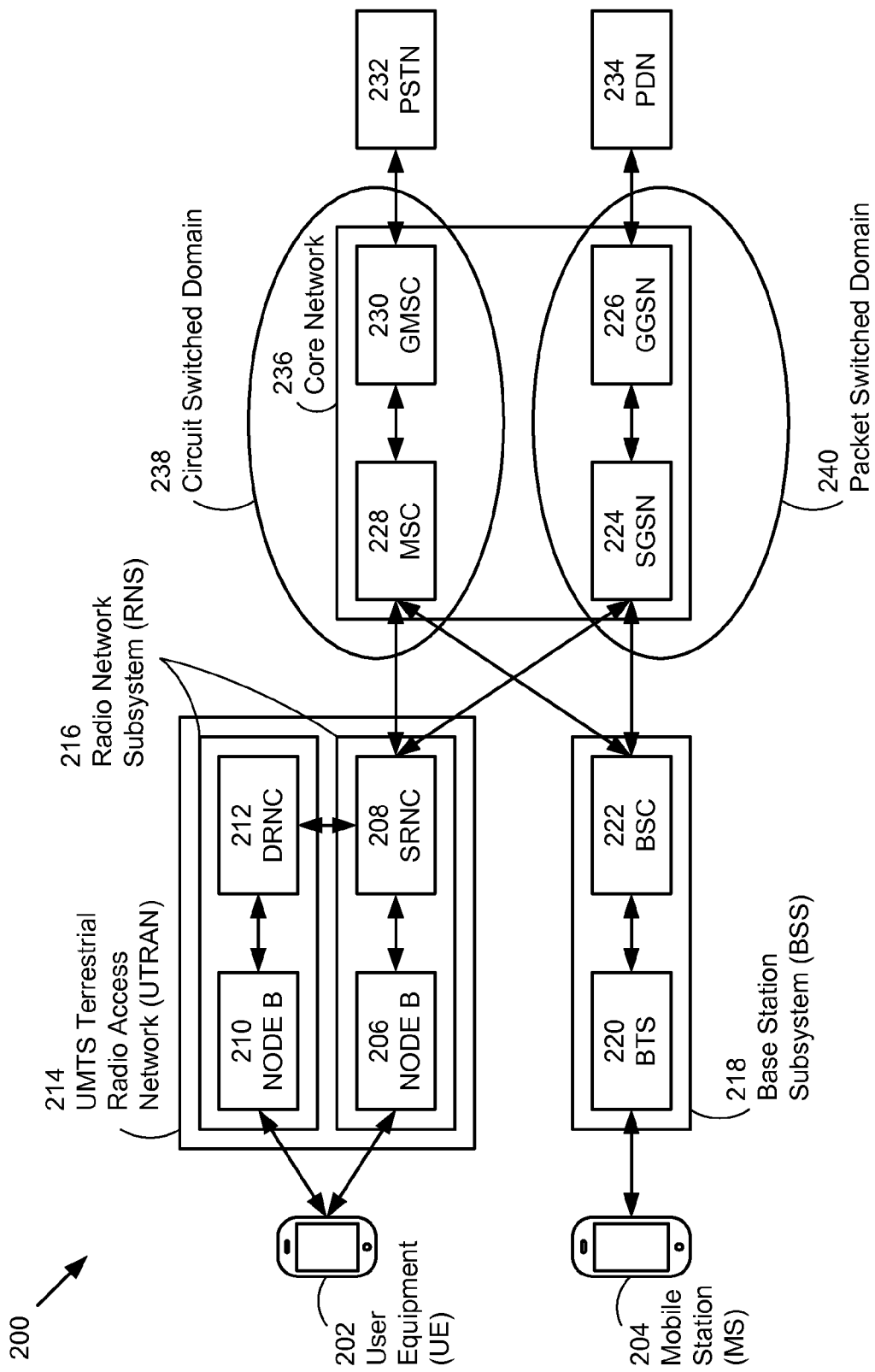
FIG. 2 illustrates a hierarchical architecture for a wireless communication network.

FIG. 2 illustrates a hybrid hierarchical architecture 200 for a wireless communication network that includes both UMTS and GSM radio access network elements. A mobile wireless communication device 106 operating in a GSM wireless communication network can be referred to as a mobile station (MS) 204, while a mobile wireless communication device 106 operating in a UMTS network can be referred to as user equipment (UE) 202. (Wireless mobile communication devices 106 can include the capability of connecting to multiple wireless communication networks that use different wireless radio network technologies, such as to a GSM network and to a UMTS network; thus the description that follows can also apply to such "multi-network" devices as well as single network devices.) The MS 204 can connect to the GSM wireless communication network through a radio network subsystem known as a base station subsystem (BSS) 218. The BSS 218 can include a base transceiver station (BTS) 220 that transmits and receive radio frequency signals between the MS and the wireless communication network and a base station controller (BSC) that manages the communication between a core network 236 and the MS 204. In a GSM wireless communication network, an MS 204 can be connected to one BSS at a time. As the MS 204 moves throughout the GSM wireless communication network, the BSC 222 can manage handover of the MS 204 to different BTS 220 located in different cells. The GSM radio access network BSS 218 connects to a centralized core network 236 that provides circuit switching and packet switching capabilities. The packet switching capability can provide a General Packet Radio Service (GPRS) that transmits internet protocol (IP) packets between the MS 204 and external data networks.

The core network 236 can include a circuit switched (CS) domain 238 that can carry voice traffic to and from an external public switched telephone network (PSTN) and a packet switched (PS) domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched (CS) domain 238 and the packet switched (PS) domain 240 of the core network 236 can each operate in parallel, and both domains can connect to different radio access networks simultaneously. The UTRAN 214 in the UMTS wireless access network can include multiple radio network subsystems (RNS) 216. Each RNS 216 can include a "Node B" 206/210 that transmits and receives radio frequency signals and a radio network controller (RNC) 208/212 that manages communication between the "Node B" 206/210 network elements and the core network 236. Unlike the MS 204 in the GSM radio access network, the UE 202 in the UMTS radio access network can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that can provide additional radio link resources through a secondary Node B 210 that can supplement the radio link through the primary Node B 206.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same frequency spectrum. Received signals can be demodulated by correlating them with a correctly matched de-spreading code. As the set of spreading codes used in W-CDMA can be mutually orthogonal, signals intended for a particular UE can be separated from signals transmitted to other UE, even though all of the signals can overlap and use the same frequency spectrum simultaneously. UMTS spread spectrum signals can occupy a wider 5 MHz channel bandwidth compared with a narrower 200 kHz channel bandwidth used by GSM signals.

In order for the UE 202 to communicate to the RNS 216, a radio resource, such as a radio access bearer (RAB) having a particular radio frequency and spreading code, can be allocated by the RNS 216 in response to a service request from the UE 202. Radio resources can be allocated when requested and available and can be de-allocated when not used in order to share the radio frequency spectrum among multiple UEs 202.

Characteristics of a RAB can depend upon the service which the RAB supports, and thus different RABs can have different quality of service (QoS) characteristics. A service with strict real-time requirements, such as a voice telephony call, can require low delay and a reserved amount of radio resources that guarantees a minimum throughput. Other services with less real-time requirements, such as internet browsing or file downloading, can allow greater delay and a "best effort" throughput that can provide no guaranteed amount of radio resources. A circuit switched (CS) voice connection between the UE 202 and the RNS 216 can use a first RAB with a first QoS profile, while a simultaneous packet switched (PS) data connection between the UE 202 and the RNS 216 can use a second RAB with a second QoS profile. The core network (CN) 236 can select an appropriate RAB for a service requested by the UE 202, and the serving RNC (SRNC) 208 can allocate the RAB as directed by the CN 216. In addition to RABs that support paths for CS voice and PS data connections, the RNS 216 can use signaling radio bearers for radio resource control (RRC) to manage the radio connections between the RNS 216 and the UE 202.

Figure 3A:
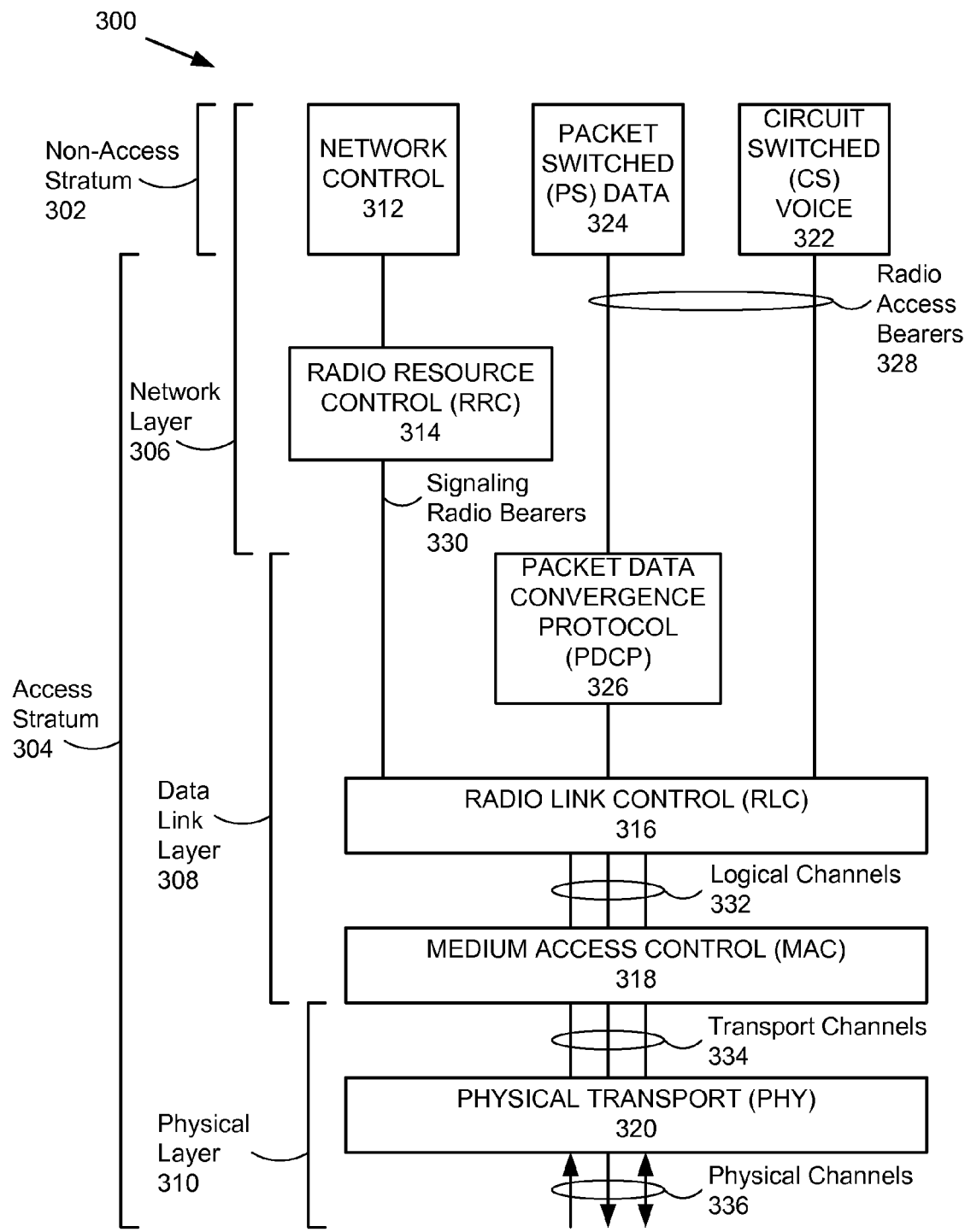
FIGS. 3A and 3B illustrate an interconnected set of layers of a communication protocol used in the mobile wireless communication device and in the wireless communication network.
Figure 3B:
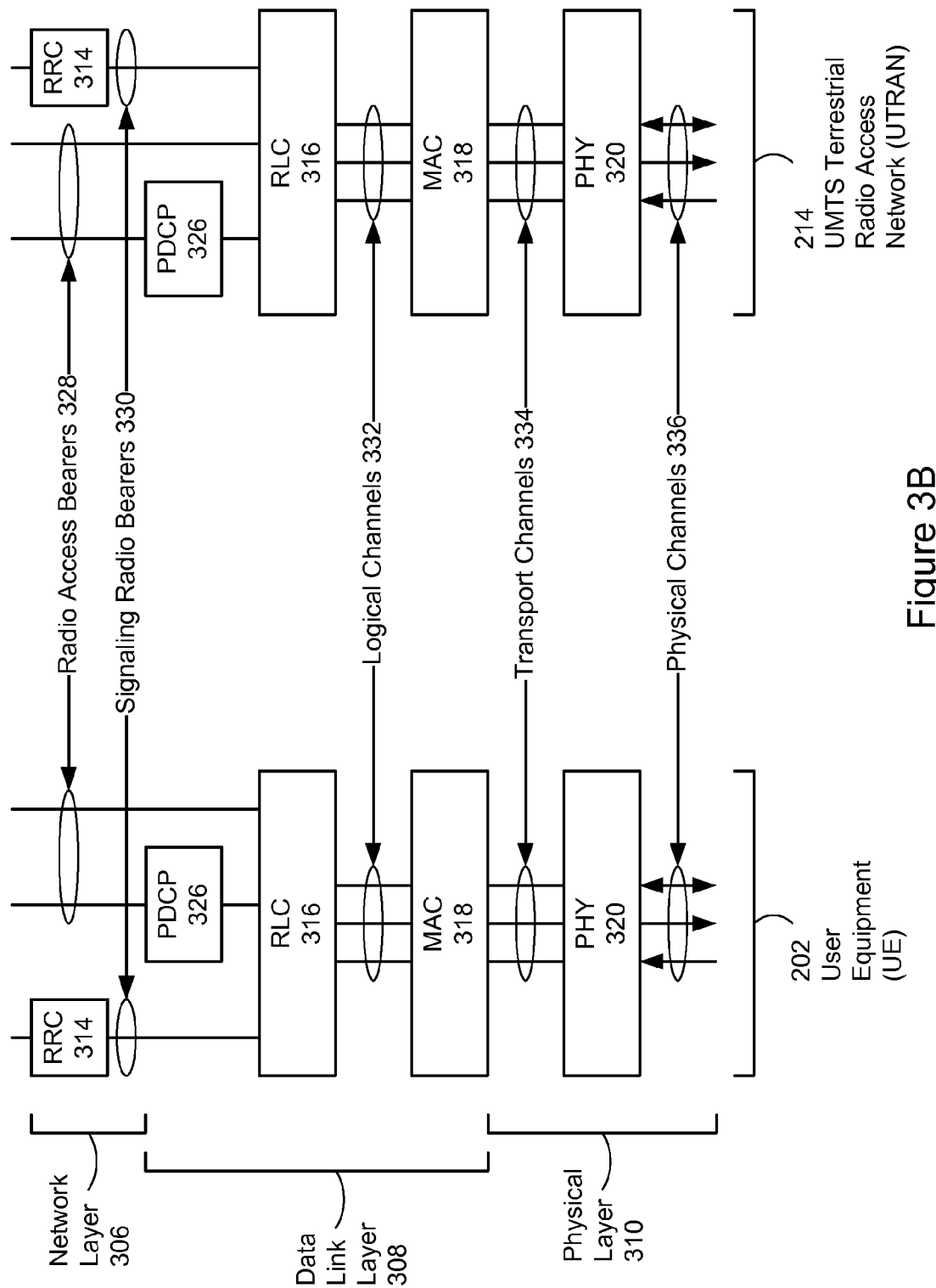

FIGS. 3A and 3B illustrate a representative layered wireless communications protocol stack 300 that includes functions that support connections between the UE 202 and the wireless communication network 100. As shown in FIG. 3B, data carrying radio access bearers 328 and control carrying signaling radio bearers 330 can provide data traffic and control signaling connections at a network layer 306 between the UE 202 and the UTRAN 214 in the wireless communication network 100. As illustrated in FIG. 3A, the communication protocol stack 300 can include an access stratum 304 and a non-access stratum 302. The non-access stratum 302 can provide user services for voice and data connections including network layer functions for data traffic and signaling between the UE 202 and core network 236 elements of the wireless communication network 100. The access stratum 304 can provide functions for the radio interface between the UE 202 and the wireless communication network 100, such as radio resource management and reliable data transport through the radio interface. Layered communication protocol stacks can be used to separate functions into distinct units separated by well defined interfaces. Individual layers can be subdivided into multiple sub-layers. Each layer or sub-layer can transmit and receive formatted data blocks known as protocol data units (PDUs) having a specific format for that layer or sub-layer. Higher layers can transmit a PDU to a lower layer that can sub-divide, aggregate and/or reformat one or more higher layer PDUs into one or more lower layer PDUs. A protocol layer in one entity at one end of a connection can provide guaranteed delivery or best effort delivery of PDUs associated with that protocol layer to a parallel protocol layer in an entity at the other end of the connection. For the connected protocol stacks shown in FIG. 3B, logical channels 332 can support exchanges of RLC 316 layer PDUs, while transport channels 334 can support exchanges of MAC 318 layer PDUs.

A physical layer 310, the first and lowest layer in the protocol stack 300, can provide physical channels 336 that can transmit and receive signals over the radio "air" interface. A physical transport (PHY) unit 320 in the physical layer 310 can map transport channels 334 to the physical channels 336 using transmit functions that can include channel coding, mapping, spreading, modulation and amplification and receive functions that can include amplification, demodulation, de-spreading, inverse mapping and channel decoding. The physical layer 310 can primarily operate at a "bit" or "symbol" level and can seek to transport sequences of bits/symbols below an acceptable error rate over a particular physical medium. The physical layer 310 can provide the transport channels 334 to a medium access control (MAC) 318 layer located in a data link layer 308. The MAC 318 layer can transmit and receive MAC PDUs (e.g. a formatted data block of bits or symbols) through the transport channels 334. The format for the MAC PDUs on the transport channels 334 can be set by a radio resource control (RRC) 314 unit in the network layer 306. The MAC 318 layer can include a hybrid automatic repeat request (HARQ) function that can include acknowledge (ACK) and negative acknowledge (NACK) signaling to indicate correct and incorrect reception of individual MAC layer PDUs. The ACK/NACK responses for HARQ can be transmitted on signaling physical channels that can be separate from data carrying physical channels. Some types of the transport channels 334 can be commonly shared among multiple UEs 202, such as broadcast channels, paging channels and control channels. Other types of transport channels 334 can be dedicated to an individual UE 202 such as a data transport channel. The MAC 318 layer can map transport channels 334 to logical channels 332 that can be classified according to the type of information they transport, typically those used for voice or data traffic and others used for control functions.

A radio link control (RLC) 316 layer in the data link layer 308 at a transmitting end can format Packet Data Convergence Protocol (PDCP) PDUs received from a PDCP 326 unit into sequences of RLC PDUs transmitted over the logical channels 332. Formatting can include segmenting and/or concatenating PDCP PDUs to fit an RLC PDU size. At a receiving end, the RLC 316 layer can reconstruct PDCP PDUs from a sequence of RLC PDUs. When operating in an acknowledged mode, the RLC 316 layer in a transmitting entity can assure correct delivery of a sequence of RLC data PDUs at a receiving entity by monitoring RLC acknowledgement responses (or lack thereof) in RLC status PDUs received from the RLC 316 layer in the receiving entity. RLC Status PDUs for the downlink RLC data PDUs can be transmitted in the uplink direction along with uplink RLC data PDUs, and thus congestion in uplink data transmission can adversely affect downlink data transmission when status RLC status PDUs cannot be received by the RLC 316 layer in the transmitting entity.

The RLC 316 layer can map logical channels 332 to radio access bearers (RABs) 328 that can carry the CS voice and PS data traffic to switching units 322/324 in the core network 236. The PDCP 326 layer can provide format conversion between IP packets used by the packet switched (PS) data unit 324 and the packet formats used by the RLC 316 layer. The RLC 316 layer can also map some logical channels 332 to signaling radio bearers 330 that can carry signaling messages to a radio resource control (RRC) block 314 that manage the radio connections, including establishing, maintaining and tearing down of the radio access bearers 328 and their corresponding mapped channels at the lower layers. As mentioned earlier, different RABs 328 can have different QoS profiles that can affect their relative operating characteristics. The RRC block 314 can determine and set dynamically the maximum bandwidth and frame sizes allowed for each data carrying RAB 328. Signaling radio bearers 330 can be assigned higher priority than data carrying radio access bearers 328 to ensure proper control of the radio connections; however, the throughput rates on signaling radio bearers 330 can be limited. Thus acknowledgement responses contained in status PDUs used for the acknowledged mode of the RLC 316 layer can be transported over "data" radio access bearers 328 rather than over "signaling" radio bearers 330. If the data rate carrying capability of a radio access bearer 328 in the uplink direction becomes overly restricted, then acknowledgements sent in the uplink direction for data received in the downlink direction (or other uplink control messages) can be stalled at the UE 202. Under certain conditions, it can be preferred to transport the uplink control messages, such as acknowledgements, temporarily on the signaling radio bearers 330 until congestion on the uplink radio access bearers 328 eases.

Figure 4:
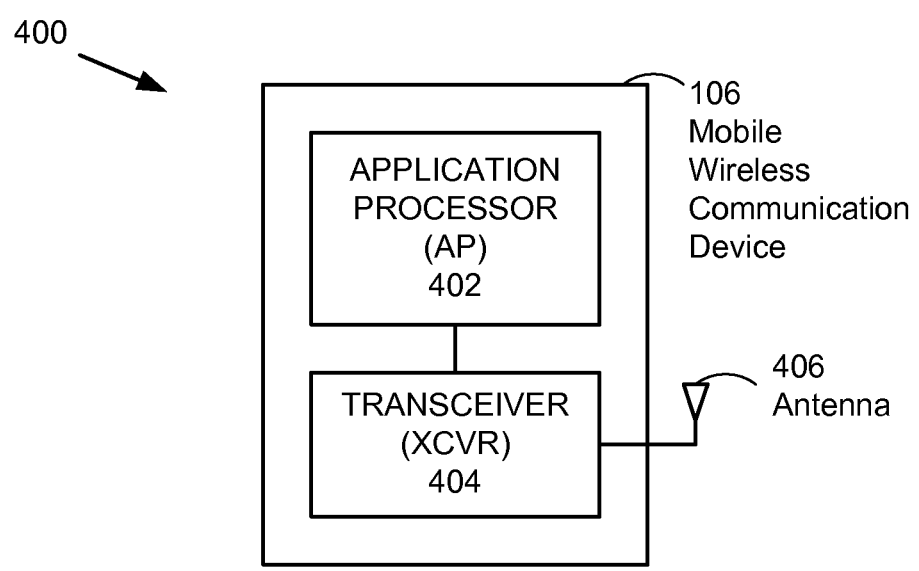
FIG. 4 illustrates components of the mobile wireless communication device.

FIG. 4 illustrates basic elements of the mobile wireless communication device 106 or UE 202. A transceiver (XCVR) 404 can transmit and receive wireless signals through an antenna 406, and the XCVR 404 can implement functions of the access stratum 304, including some or all portions of the physical layer 310, the data link layer 308 and the network layer 306. An applications processor (AP) 402 can provide the mobile wireless communication device 106 or UE 202 with functions in the non-access stratum 302, including portions of the network layer 306. Essentially the XCVR 404 provides a wireless connection over which the AP 402 can realize data connections that exchange data packets and voice connections. Alternative architectures can also be used, and functions realized as described in the AP 402 and XCVR 404 can be divided differently than outlined above. In general, the AP 402 can handle high layers nearer the top of the communications protocol stack 300, while the XCVR 404 can process lower layers nearer the bottom of the communications protocol stack 300.

Figure 5:
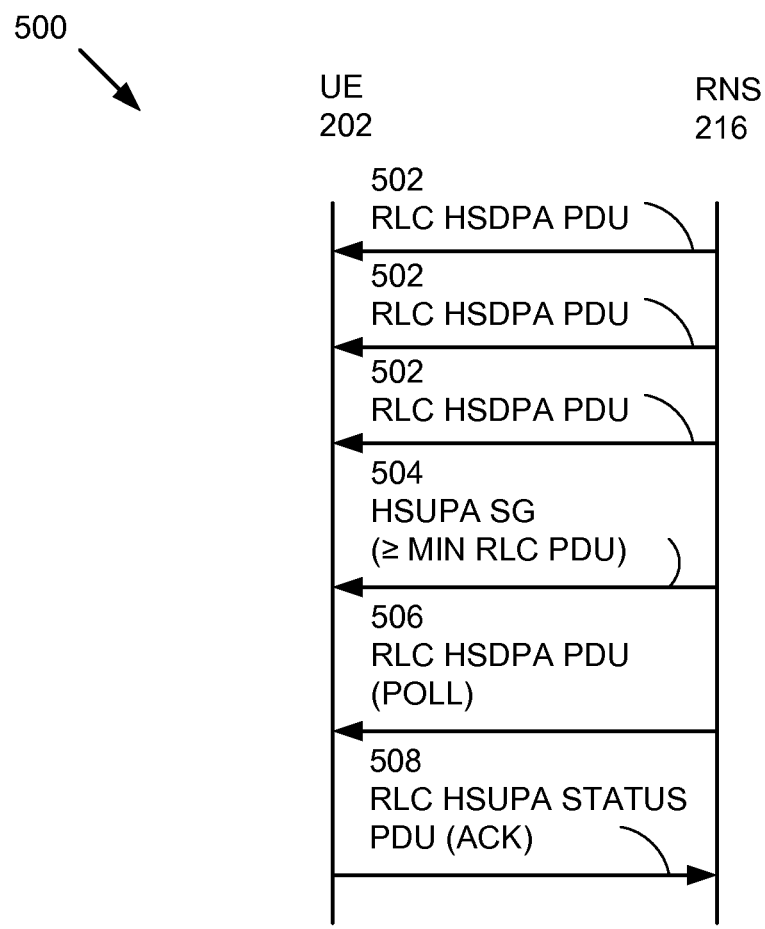
FIG. 5 illustrates an exchange of data link layer messages between a user equipment (UE) and a radio network subsystem (RNS) of the wireless communication network including a successful acknowledgement.

FIG. 5 illustrates an exchange 500 between parallel RLC entities in the UE 202 and in the RNS 216 located in the access portion of a wireless communication network 100. The exchange 500 shows a successful acknowledgement of data packets received over a high speed downlink packet access (HSDPA) connection in the downlink direction by sending a status PDU that contains an acknowledgement over a high speed uplink packet access (HSUPA) connection in the uplink direction. A series of RLC HSDPA PDUs 502 can be transmitted from the RNS 216 to the UE 202 in the downlink direction. The UE 202 can acknowledge the received RLC HSDPA PDUs 502 by sending an RLC HSUPA status PDU 508. The RLC HSUPA status PDU 508 can be transmitted by the UE 202 in response to a poll from the RNS 216 contained in an RLC HSDPA PDU 506. (Status PDUs can also be sent when PDUs are received out of sequence or lost or in error.) The RLC HSUPA status PDU 508 can be sent when an HSUPA serving grant (SG) 504 from the RNS 216 provides enough data carrying capacity to contain the RLC HSUPA status PDU 508 in a transmission time interval of a certain length.

Serving grants can provide the UTRAN 214 a method by which limited radio resources can be shared in the uplink direction by multiple UEs 202. As shown in FIG. 2, the UE 202 can be connected to multiple Node Bs 206/210 simultaneously. In addition multiple UEs 202 can be connected to each Node B 206/210 simultaneously. The wireless communication network 100 can control uplink transmission from a UE 202 using scheduled and non-scheduled data flows. A non-scheduled grant for a radio bearer can be allocated a maximum block size per transmit time interval. This allocation can occur when the radio bearer is set up. This non-scheduled grant can support constant rate services such as a voice-over-IP connection or for time critical data such as signaling data. As the non-scheduled grant can be constant, the dedicated data rate can be relatively low, such as 16 kbps.

For higher rate data connections (for example corresponding to multiple Mbps), a scheduled serving grant can be allocated. The serving RNC 208 connected to Node B 206 in one of the RNS 216 can send absolute serving grants on an absolute grant channel (AGCH) and/or relative serving grants on a relative grant channel (RGCH) that can determine the data rate (i.e. number of bits permitted in a transmit time interval). Relative serving grants can be used to increment or decrement the current absolute serving grant. The serving grant (including any relative adjustments) can specify a data rate cap in the uplink direction indirectly by dictating a maximum power offset to use for transmitting scheduled data over the HSUPA connection. The UE 202 can calculate the resulting number of bits for a transmit time interval. Knowing an amount of pending data waiting in a transmit buffer for transmission in the uplink direction, the UE 202 can also determine if the current serving grant can provide sufficient throughput so that all pending data can be sent in a certain sized extended time interval. If the current serving grant suffices to empty the transmit buffer within the extended time interval, the UE 202 can be "happy" with the current serving grant, otherwise the UE 202 can be "not happy." The UE 202 can report whether it is "happy" or "not happy" with the current serving grant using a "happy bit" sent in the uplink direction using an uplink control channel, such as the Enhanced Dedicated Physical Control Channel (E-DPCCH) for HSUPA. The RNS 216 in the serving RNC 208 can monitor the "happy bits" received from the UE 202 to determine subsequent serving grants. Note that the UE 202 can be "unhappy" yet still be able to transmit some data in the uplink direction. Thus a "stalled" state at the UE 202 when insufficient uplink throughput can be available on which to send any uplink data (including the "happy bit") can be more severe than an "unhappy" state alone.

Figure 6:
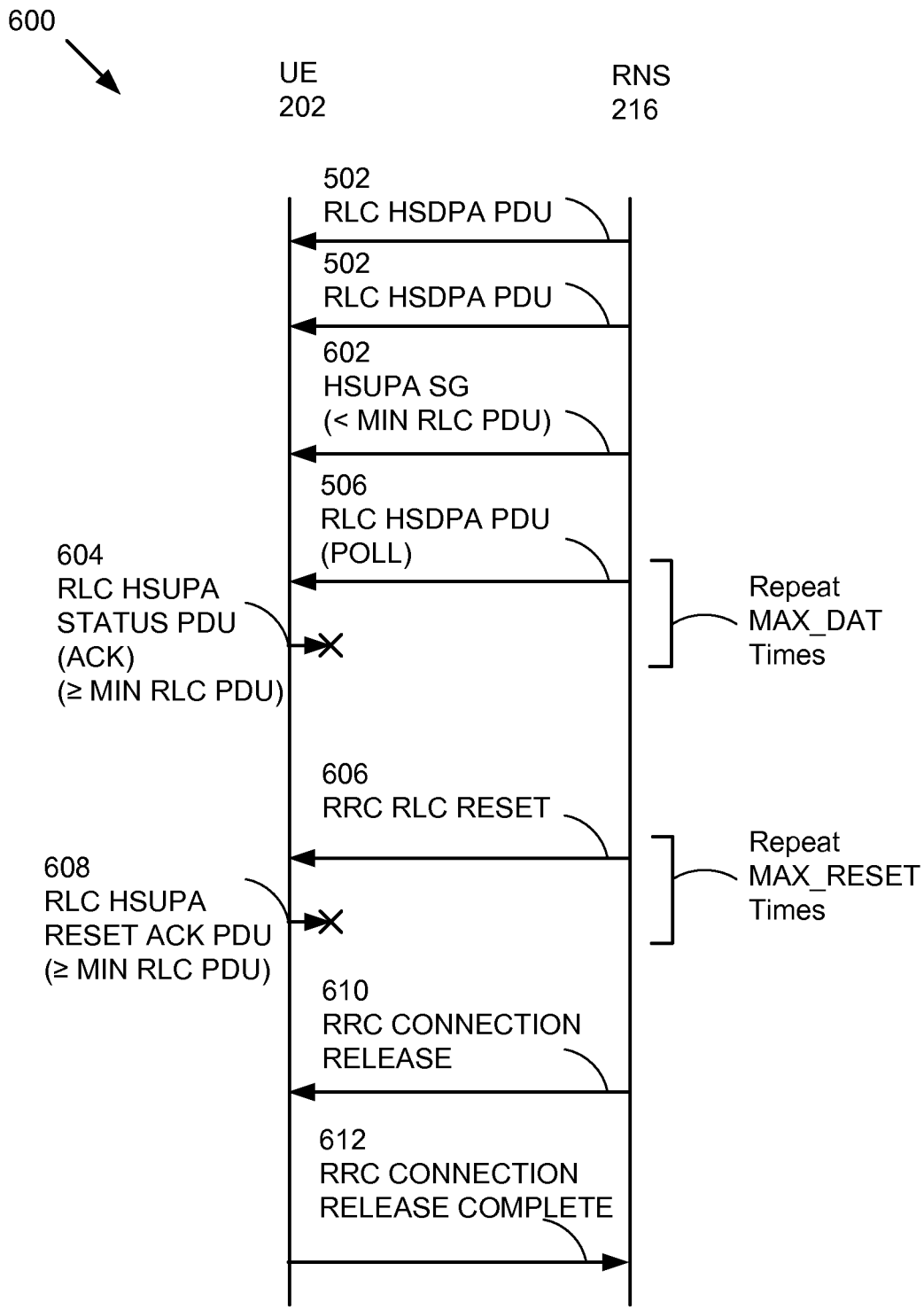
FIG. 6 illustrates an exchange of data link layer messages and network layer messages between the UE and the RNS during radio access network congestion with no successful acknowledgement and a connection release.

When the current serving grant allows fewer bits than required to send one RLC PDU in the uplink direction, the UE 202 can be unable to transmit any data or status to the RNS 216. FIG. 6 illustrates an exchange 600 where a connection between the UE 202 and the RNS 216 can be released by the RRC 314 layer due to network congestion in the uplink direction. The RNS 216 can send one or more RLC HSDPA PDUs 502 in the downlink direction. An HSUPA serving grant 602 can be sent from the RNS 216 that does not allow a minimum size RLC PDU to be sent in the uplink direction. The RNS 216 can be unaware that the serving grant is insufficient. The RNS 216 can send an additional RLC HSDPA PDU 506 that includes a poll for status from the UE 202. The UE 202 can form an RLC HSUPA status PDU 604 containing an acknowledgement of the downlink RLC HDSPA PDUs 502/506 but can be unable to send it because of the inadequately sized serving grant. When no status PDU 604 is received in response to the status poll 506, the RNS 216 can repeat the polling for status from the UE 202 up to a MAX_DAT number of times.

After an unsuccessful repeated polling, the RNS 216 can attempt to reset operations in the RLC layer 316 of the UE 202 by sending an RRC RLC Reset 606 message. The UE 202 can receive the RRC RLC Reset 606 message and appropriately reset it's RLC layer 316. In response to the RRC RLC Reset 606 message, the UE 202 can attempt to send an RLC HSUPA Reset ACK PDU 608 in the uplink direction, but the inadequate serving grant can deny adequate uplink transmission bandwidth of this acknowledgement as well. The RNS 216 can repeat sending the RRC RLC Reset 606 message up to a MAX_RESET number of times, after which the RNS 216 can determine that the connection to the UE 202 should be terminated. The RNS 610 can send an RRC Connection Release 610 signaling message to sever the connection, as the connection appears to be broken. In response to the RRC Connection Release 610 signaling message, the UE 202 can send an RRC Connection Release Complete 612 signaling message back to the RNS 216. Unlike the RLC PDUs that can contain acknowledgements from the UE 202, the RRC Connection Release Complete 612 message can be successfully transmitted in the uplink direction because it can use a signaling path separate from the stalled data carrying path used for the RLC PDUs. The signaling path can be not affected by the serving grant that limits the data carrying path. As signaling paths can provide a guaranteed connection, when the data carrying bath is blocked by network congestion, control messages, such as status PDUs, normally transported on the data path can be transported instead on the signaling path as described below.

Figure 7:
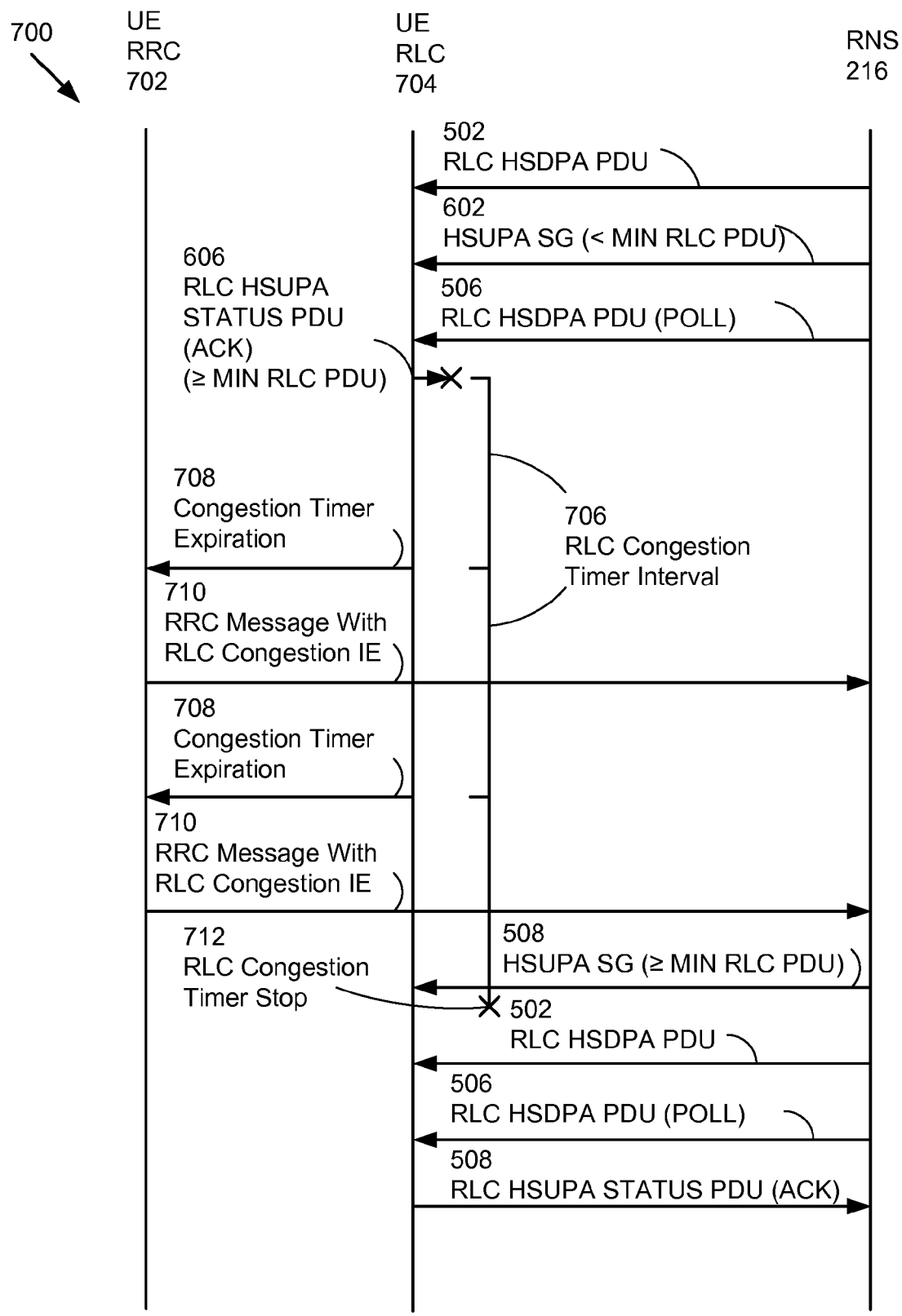
FIG. 7 illustrates an exchange of data link layer messages and network layer messages between the UE and the RNS during radio access network congestion with a successful acknowledgement.

FIG. 7 illustrates an exchange 700 in which control information can be communicated from the UE 202 to the RNS 216 using signaling radio bearers when the data carrying radio access bearers provide insufficient throughput capability in the uplink direction during network congestion. Initially, the RNS 216 can send an RLC HSDPA PDU 502 in the downlink direction to the UE RLC 704 in the UE 202. Next, the RNS 216 can send an HSUPA serving grant (SG) 602 that can provide an uplink data throughput bit carrying capacity of less than a minimum sized RLC PDU during a transit time interval. (The HSUPA SG 602 can also precede the RLC HSDPA PDU 502.) The RNS 216 can then poll the UE 202 for status by setting a polling indication in a downlink RLC HSDPA PDU 506. In response to the poll, the UE 202 can form an uplink RLC HSUPA status PDU 606 that can include an acknowledgement for the received downlink RLC HSPDA PDUs 502/506. The RLC HSUPA status PDU 606 can be at least a minimum sized RLC PDU, which can be larger than permitted by the current serving grant. As such, the UE RLC 704 can be unable to communicate status about received downlink packets in the uplink direction to the RNS 216.

When the UE 202 detects that a pending uplink signaling message, such as a status PDU, is waiting for transmission and also detects that the current serving grant can not provide sufficient bandwidth to transmit the pending uplink signaling message, the UE 202 can determine that an uplink network congestion condition exists. The UE 202 can start an RLC congestion timer and wait for an RLC congestion timer interval 706. Upon expiration 708 of the RLC congestion timer, the radio resource control (RRC) unit 702 in the UE 202 can send an RRC message 710 that includes an RLC congestion information element (IE). This RLC congestion IE can include "super fields" that contain information that would normally be sent in an RLC control message (PDU), such as RLC status, RLC PDU acknowledgement, RLC PDU negative acknowledgement, RLC reset and RLC reset acknowledgement. One representative RRC message is an RRC traffic volume measurement (TVM) message. Alternatively a new RRC message can be defined to carry the RLC control information when network congestion exists. The RLC congestion timer interval can be set to ensure that successive RRC messages 710 can be spaced sufficiently far apart to not overwhelm the bandwidth of the signaling path. The RLC congestion timer interval can also be set to allow enough time for the RNS 216 in the network to change the serving grant when the UE 202 indicates an "unhappy" bit to avoid switching the status to the signaling path over the data path too quickly. The RLC congestion timer interval can be sufficiently short though to ensure that the connection between the UE 202 and the RNS 216 is not released, or the data flow in the downlink direction is not impacted, due to lack of acknowledgements sent in the uplink direction. Without acknowledgements, the downlink transmitter's sliding window can stall, and ultimately can result in a release of the radio bearer supporting transmission between the UE 202 and the RNS 216. The UE RLC 704 can restart the RLC congestion timer each time it expires as shown in FIG. 6. Alternatively, the RLC congestion timer can be restarted after the RRC message 710 that includes the RLC congestion IE is sent.

The RRC message 710 containing the RLC congestion IE 710 can be transported on a signaling radio bearer rather than on a data carrying radio access bearer, and thus the serving grant from the RNS 216 can not impede the RRC message's 710 transmission. While the network congestion condition exists, the UE RRC 702 can send an RRC message 710 that includes an RLC congestion IE each time the congestion timer expires 708. As the RLC congestion IE can include status information with the "happy bit", the RNS 216 can learn that the uplink path from the UE 202 has insufficient bandwidth. Depending on overall network conditions, eventually the RNS 216 can change the serving grant (SG) to the UE 202 by sending a new HSUPA SG 508 message that permits at least a minimum size RLC PDU to be transmitted in a transmit time interval. The SG change can be realized by an absolute grant message or a relative grant message. Upon receipt of the increased HSUPA SG 508, the UE can stop the RLC congestion timer 712 and subsequent RLC HSUPA status PDUs 506 that contain can contain acknowledgements can be sent on radio access bearers again rather than in RRC messages on signaling radio bearers.

Figure 8:
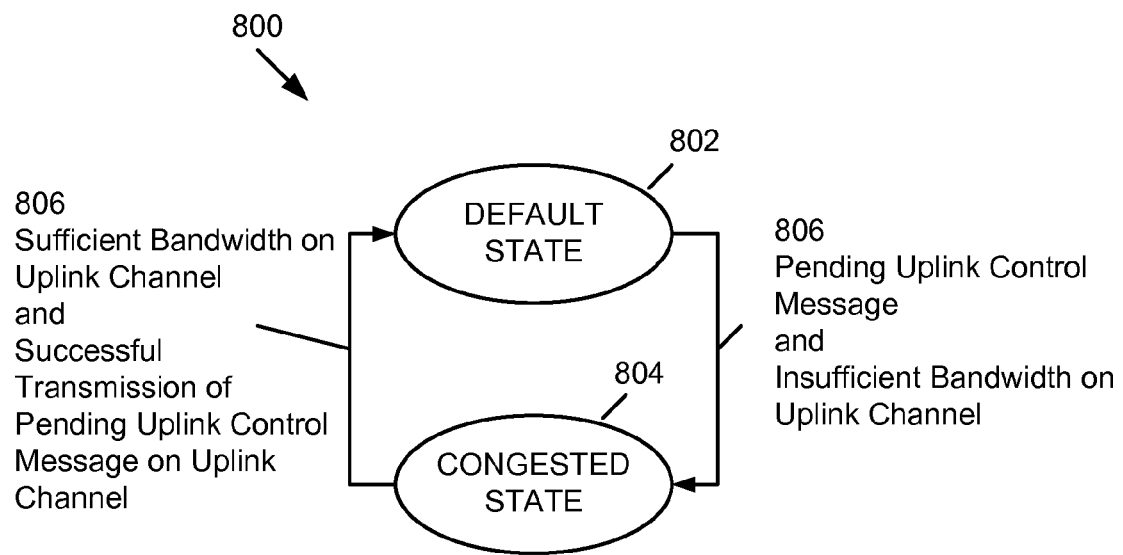
FIG. 8 illustrates a state diagram for the UE.

FIG. 8 illustrates a state diagram 800 for the UE 202, which toggles between a default state 802 and a "congested" state 804 based on the current serving grant and a state of pending uplink control messages in an uplink buffer. If an uplink control message is pending in the uplink buffer and if there is insufficient bandwidth on an uplink channel to send the uplink control message (such as based on the throughput capacity available on a transport channel in a transmission time interval specified by a serving grant from the RNS 216), then the UE 202 can transition 806 from the default state 802 to the congested state 804. The UE 202 can remain in the congested state 804 and transition to the default state 802 when sufficient bandwidth exists on the uplink channel and when at least one pending uplink control message can be transmitted successfully on the uplink channel. When the UE 202 is in the default state 802, RLC control messages can be sent normally as RLC PDUs over data carrying radio access bearers. When the UE 202 is in the congested state 804, information from RLC control messages can be sent in RRC messages over signaling radio bearers until sufficient bandwidth on the uplink channel becomes available. As signaling radio bearers have a guaranteed minimum bandwidth that can support the RRC messages that can provide status to the RNS 216 for downlink transmissions, the connection between the UE 202 and the RNS 216 in the wireless communication network 100 can be maintained, even when uplink network congestion impedes the transmission of uplink PDUs on transport channels using the data carrying radio access bearers. To minimize the number of RRC messages sent on the signaling radio bearers to provide RLC status when network congestion exists, the UE 202 can appropriately aggregate status information and can send them less frequently than can occur when sending them on the data carrying radio access bearers.

Figure 9:
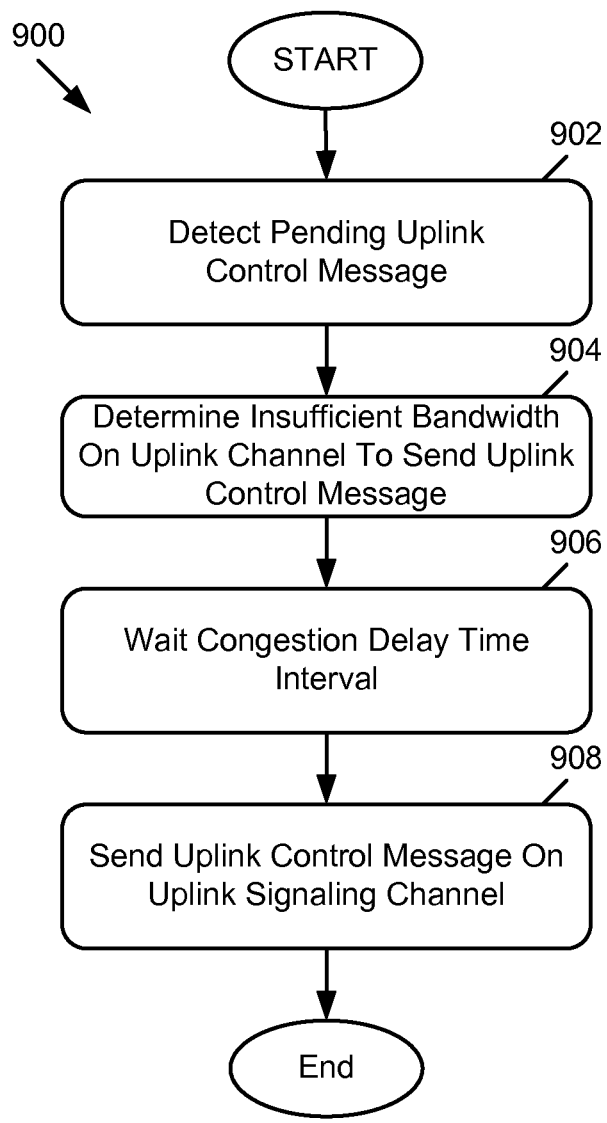
FIG. 9 illustrates a representative method for radio link control between a mobile wireless communication device and a wireless network during radio access network congestion.

FIG. 9 illustrates a representative method 900 for radio link control between the mobile wireless communication device 106 and the RNS 216 in the wireless communication network 100. In step 902, the mobile wireless communication device 106 can detect that an uplink control message is pending transmission in the uplink direction to the RNS 216. In a representative embodiment, the transceiver 404 can include a buffer that can store uplink control messages that can be formatted and ready for transmission in the uplink direction to the RNS 216. The mobile wireless communication device 106 can determine in step 904 that a bandwidth (i.e. data throughput capacity during a transmission time interval) on the uplink channel is insufficient to send at least one uplink control message. The uplink channel can normally transport uplink control messages using the same radio access bearers used to transport data messages from the mobile wireless communication device 106 to the RNS 216. After waiting a congestion delay time interval in step 906, the mobile wireless communication device 106, in step 906, can send the pending uplink control message on an uplink signaling channel rather than on the uplink channel. The uplink signaling channel can use different radio resources, such as signaling radio bearers, to transport the uplink control message rather than the radio access bearers used normally to transport data and uplink control messages. In a representative embodiment, the bandwidth of the uplink channel can be determined by commands, such as serving grants, received from one or more RNS 216 in the wireless communication network 100.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for radio link control in a mobile wireless communication device connected to a radio network subsystem of a wireless cellular network, the method comprising:
   at the mobile wireless communication device:
   detecting a pending uplink control message;
   receiving a serving grant from the radio network subsystem of the wireless cellular network, the serving grant including a non-zero allocation of radio resources for transmission on a data carrying uplink channel;
   determining that the serving grant provides insufficient radio resources on the data carrying uplink channel to send the pending uplink control message;
   waiting a congestion delay time interval; and
   sending the pending uplink control message on an uplink signaling channel instead of on the data carrying uplink channel.

2. The method as recited in claim 1,
   wherein the data carrying uplink channel is associated with a data carrying radio access bearer and the uplink signaling channel is associated with a signaling radio bearer.

3. The method as recited in claim 1, wherein the mobile wireless communication device determines that the serving grant provides insufficient radio resources by comparing a size of the pending uplink control message to a bit carrying capacity of the non-zero allocation of radio resources of the serving grant.

4. The method as recited in claim 3,
   wherein the serving grant specifies a block size that the mobile wireless communication device can transmit during a transmission time interval.

5. The method as recited in claim 3,
   wherein the serving grant specifies a maximum transmit power level that the mobile wireless communication device can use during a transmission time interval.

6. An apparatus for radio link control in a mobile wireless communication device, the apparatus comprising:
   a transceiver configured to:
   receive downlink data packets on a bi-directional data carrying radio access bearer from a radio network subsystem in a wireless cellular network;
   send uplink control packets that acknowledge receipt of the downlink data packets on the bi-directional data carrying radio access bearer to the radio network subsystem;
   detect an uplink congestion condition on the bi-directional data carrying radio access bearer between the mobile wireless communication device and the radio network subsystem in the wireless cellular network; and
   send the uplink control packets on a signaling radio bearer instead of on the bi-directional data carrying radio access bearer while the uplink congestion condition persists,
   wherein the transceiver is further configured to:
   receive an uplink serving grant from the radio network subsystem in the wireless cellular network that limits an amount of data that the mobile wireless communication device can send in an uplink direction on the bi-directional data carrying radio access bearer during a transmit time interval.

7. The apparatus as recited in claim 6, wherein the transceiver detects the uplink congestion condition when the uplink serving grant limits the amount of data to send in the uplink direction on the bi-directional data carrying radio access bearer during the transmit time interval to less than a minimum size uplink control packet.

8. The apparatus as recited in claim 6, wherein the transceiver is further configured to receive an uplink serving grant adjustment from a second radio network subsystem in the wireless cellular network that lowers the amount of data that the mobile wireless communication device can send in the uplink direction on the bi-directional data carrying radio access bearer during the transmit time interval.

9. The apparatus as recited in claim 8, wherein the transceiver detects the uplink congestion condition when the lowered amount of data is less than required to transport a minimum size uplink control packet.

10. An apparatus for radio link control in a mobile wireless communication device, the apparatus comprising:
a transceiver configured to:
receive downlink data packets on a bi-directional data carrying radio access bearer from a radio network subsystem in a wireless cellular network;
send uplink control packets that acknowledge receipt of the downlink data packets on the bi-directional data carrying radio access bearer to the radio network subsystem;
detect an uplink congestion condition on the bi-directional data carrying radio access bearer when any uplink serving grants received from the radio network subsystem for allocation of resources to the bi-directional data carrying radio access bearer are inadequate to transmit at least one minimum size uplink control packet; and
send the uplink control packets on a signaling radio bearer instead of on the bi-directional data carrying radio access bearer while the uplink congestion condition persists,
wherein the transceiver is further configured to send each of the uplink control packets on the signaling radio bearer spaced apart by at least a congestion time interval.

11. An apparatus for radio link control in a mobile wireless communication device, the apparatus comprising:
a transceiver configured to:
receive downlink data packets on a bi-directional data carrying radio access bearer from a radio network subsystem in a wireless cellular network;
send uplink control packets that acknowledge receipt of the downlink data packets on the bi-directional data carrying radio access bearer to the radio network subsystem;
detect an uplink congestion condition on the bi-directional data carrying radio access bearer when any uplink serving grants received from the radio network subsystem for allocation of resources to the bi-directional data carrying radio access bearer are inadequate to transmit at least one minimum size uplink control packet; and
send the uplink control packets on a signaling radio bearer instead of on the bi-directional data carrying radio access bearer while the uplink congestion condition persists,
wherein the transceiver is further configured to:
detect clearance of the uplink congestion condition on the bi-directional data carrying radio access bearer when uplink serving grants received from the radio network subsystem allow transmission of at least one minimum size uplink control packet; and
send the uplink control packets on the bi-directional data carrying radio access bearer instead of on the signaling radio bearer after the uplink congestion condition clears.

12. The apparatus as recited in claim 11, wherein uplink serving grants indicate an amount of data that the mobile wireless communication device can send in an uplink direction on the bi-directional data carrying radio access bearer during a transmit time interval.

13. The method as recited in claim 1, wherein the mobile wireless communication device and the wireless cellular network operate in accordance with a third generation (3G) universal mobile telecommunications system (UMTS) wireless communication protocol.

* * * * *